United States Patent [19]

Zukowski

[11] 4,187,033
[45] Feb. 5, 1980

[54] VARIABLY PRELOADED BALL JOINT ASSEMBLY

[75] Inventor: Leonard J. Zukowski, Sterling Heights, Mich.

[73] Assignee: TRW Inc., Cleveland, Ohio

[21] Appl. No.: 833,739

[22] Filed: Sep. 16, 1977

[51] Int. Cl.² .................... F16D 1/12; F16C 11/06
[52] U.S. Cl. ............................. 403/137; 280/95 R
[58] Field of Search ............ 403/132, 133, 135, 137, 403/138, 90, 56; 280/95, 85, 85 A

[56] References Cited

U.S. PATENT DOCUMENTS

| 1,848,471 | 3/1932 | Gebert et al. ............ 403/137 |
|-----------|--------|----------------------------------|
| 2,736,580 | 2/1956 | Boetcker ................. 403/132 |
| 3,135,540 | 6/1964 | Herbenar ............... 403/132 X |
| 3,408,124 | 10/1968 | Melton et al. ........... 403/133 X |
| 3,574,369 | 4/1971 | Andrew ................. 403/132 |
| 3,787,127 | 1/1974 | Cutler ................... 403/133 |
| 3,904,300 | 9/1975 | Hetmann ............... 403/132 X |

FOREIGN PATENT DOCUMENTS

| 233067 | 2/1961 | Australia ................... 403/135 |
|--------|--------|--------------------------------------|
| 461065 | 3/1929 | Fed. Rep. of Germany ...... 403/137 |

Primary Examiner—Wayne L. Shedd

[57] ABSTRACT

A ball and socket structure is disclosed for connecting the rack bar and tie rod of the vehicle steering system in which opposed bearing surfaces engage opposite hemispheres of the ball end. A tubular housing is internally threaded from one end and is formed with one of the bearing surfaces at its other end. A pre-loading plug or disc is threaded along the internal threads to a pre-loading position in which it compresses a high rate spring elastomeric to pre-load the two bearing surfaces toward each other the disc being supported during use by threading the end of the rack bar into the housing until the threaded end bottoms out against the pre-loading plug.

23 Claims, 5 Drawing Figures

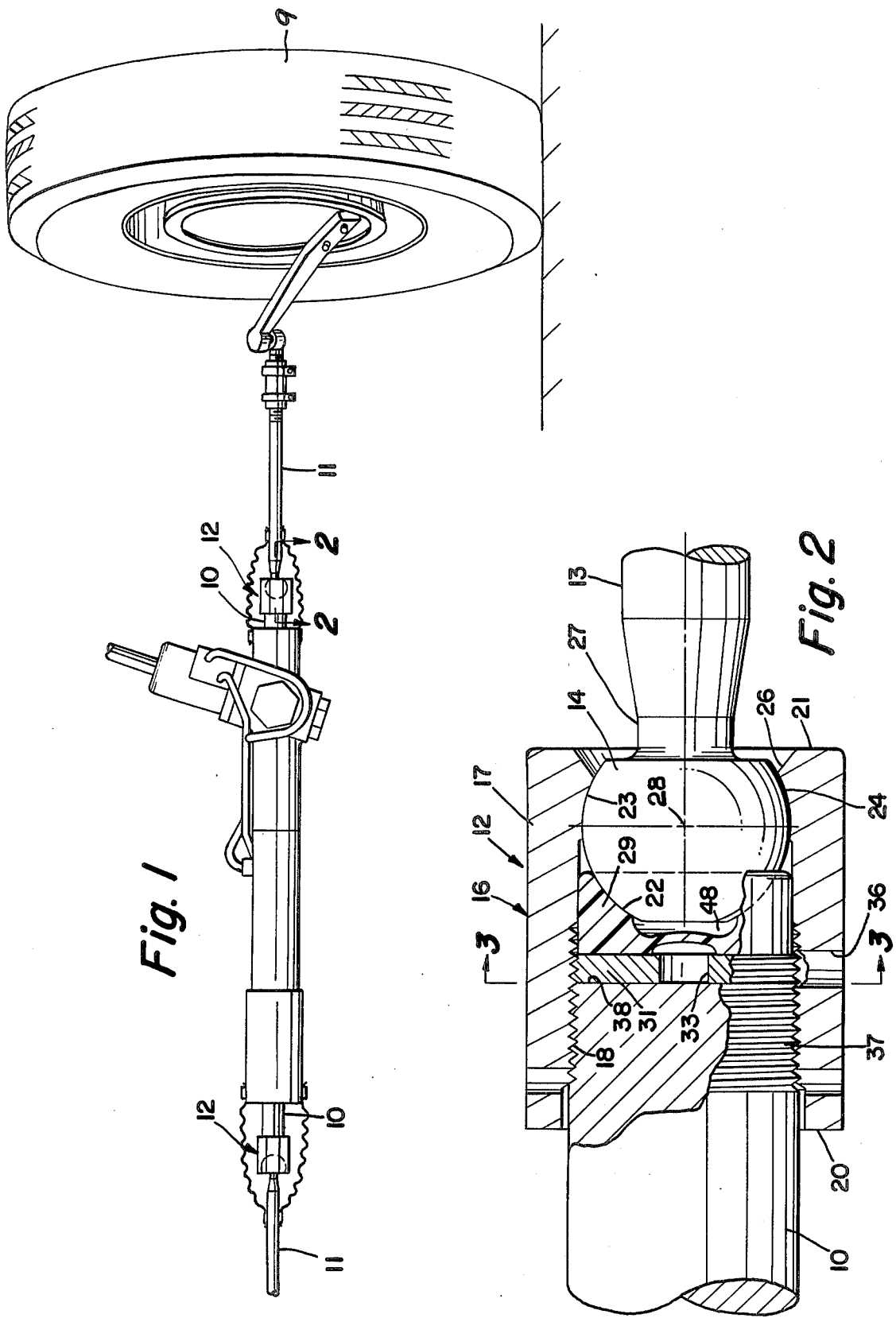

VARIABLY PRELOADED BALL JOINT ASSEMBLY

BACKGROUND OF THE INVENTION

This invention relates generally to rack and pinion automotive steering systems or the like, and more particularly to a novel and improved ball and socket structure for connecting the rack bar and tie rods in such a steering system.

PRIOR ART

Ball and socket connections for use in automotive steering systems are known. Examples of such connections are illustrated in the U.S. Pat. Nos. 3,834,727; 3,693,999; 3,849,009; and 3,950,006. In two of such patents, Nos. 3,693,999 and 3,950,006, (assigned to the assignee of the present invention) a ball and socket connection is provided for connecting the rack bar and a tie rod in a rack and pinion steering system. In these patents two plastic elements provide opposed surfaces which engage opposite hemispheres of a ball end of a ball stud. Such connections are assembled with the two plastic elements prestressed or preloaded to permit transmission of steering movement without end play and to provide a substantially constant turning torque under load. In such connection, the parts are assembled, preloaded and the housing parts are then swaged to maintain the parts in the preloaded and assembled position.

SUMMARY OF THE INVENTION

The present invention provides a novel and improved ball and socket connection for use in automotive steering systems or the like. The improved ball and socket connection is structured to provide ease of assembly and to improve the accuracy of the preloading of the bearing element established during its manufacture. Such connection is also structured for ease of field installation and so that the preload established during manufacture of the connection is not significantly altered during its installation in the steering system. Further, the interconnection between the ball and socket connection and the rack bar provides supplemental support of the preloading structure so that structural failure does not occur under the severe loading conditions which can be encountered during the use of the vehicle on which the steering system is installed.

In one illustrated embodiment the ball and socket connection includes an elastomeric element which provides one of the opposed surfaces journaling the ball of the ball stud. Such elastomeric element and the ball end are positioned within a tubular housing which is internally threaded to receive the threaded end of the rack bar of the steering system. Preloading is obtained by use of a relatively thin plug or disc threaded into the tubular housing against the elastomeric element with sufficient torque to provide the desired preloading force or stress within the elastomeric element. Once the desired preloading force or stress is established by the adjustment of the plug along the housing threads, the plug is permanently staked or otherwise locked in its adjusted position.

The elastomeric element constitutes a high rate spring which is preloaded to the desired degree during assembly. Because of the high rate characteristic of the elastomeric element, it is necessary to accurately position the plug and to accurately maintain its position during the installation and use of the joint in a steering system. This accurate positioning is easily accomplished with the threaded connection between the housing and the plug.

Still further, the structure is arranged so that the plug is engaged during installation by the end of the rack bar which is also threaded into the housing. The engagement of the end of the rack bar and the plug provides additional support for maintaining the position of the plug when the connection is subjected to high loading conditions during its use. Consequently, it is safe to utilize a relatively thin plug having a short thread length, even though the connection is often subjected to very high loads during its use in a steering system.

In one embodiment, the elastomeric element is produced with an unstressed shape which is elastically changed during the assembly and preloading so that the element tends to elastically return to its unstressed shape as wear occurs to maintain sufficient tightness in the connection for continued satisfactory use even after wear has occurred.

In another embodiment, a relatively thin flat washer-like elastomeric element is utilized to provide the resiliency for preloading. In this embodiment, an even higher spring rate is present and the accuracy of establishing and maintaining the preload by the use of a threaded plug is of even greater importance.

BRIEF DESCRIPTION OF THE DRAWINGS

Further features of the present invention will be apparent to those skilled in the art from the following description to the invention made with reference to the accompanying drawings in which:

FIG. 1 is a schematic illustration of an automotive steering system with ball and socket connections in accordance with the present invention installed therein;

FIG. 2 is an enlarged fragmentary view, partially in longitudinal section, illustrating one preferred embodiment of this invention;

DESCRIPTION OF PREFERRED EMBODIMENTS

Figure 3:
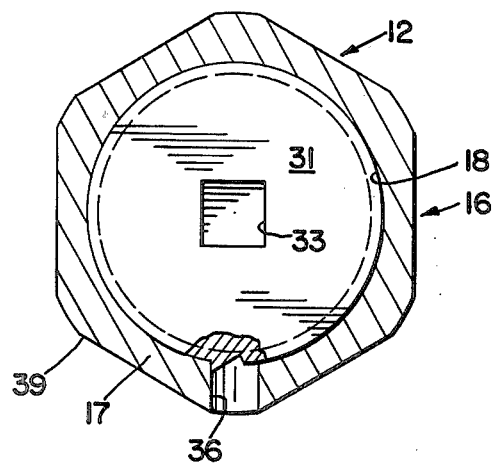
FIG. 3 is an end view of the connection illustrated in FIG. 2 with the rack removed to illustrate the adjustable plug for preloading the connection.

FIG. 1 schematically illustrates an automotive power steering system with ball and socket connections incorporating the present invention installed therein. Such system includes an elongated rack bar 10, which constitutes the drive member for the steering system, and its connection to the dirigible wheels by tie rods 11 so that longitudinal movement of the rack bar 10 produces the required steering of the dirigible wheels 9.

In the illustrated steering system a ball and socket connection 12 is threaded onto each end of the rack bar 10 and provides the connection between the rack bar and each of the associated tie rods 11. It should be understood that the structure of each of the ball and socket connections 12 is similar and that the following detailed description of the illustrated embodiments applies equally to both connections 12.

Referring to FIGS. 2 and 3 the tie rod 11 is provided with a ball stud 13 having a ball end 14 integrally formed on the end thereof and constituting a part of the ball and socket connection 12. Such connection also includes a socket assembly 16 providing a tubular housing 17 having an internal thread 18 extending along the housing 17 from one end 20 thereof. The ball end 14 is journaled within the housing 17 adjacent to its other end 21 between opposed bearing surfaces 22 and 23 which engage opposed hemispheres of the ball end 14 and axially locate the ball end 14 with respect to the housing 16. Such connection allows the ball stud 13 to tip and rotate with respect to the housing 16 and prevent any substantial other movement.

In this illustrated embodiment the bearing surface 23 is provided by the inner face of an inwardly extending integral flange 24 formed in the housing 16. However, it should be understood that it is within the broader aspects of this invention to provide the bearing surface 23 on a separate metallic or non-metallic element suitably mounted in the end of the tubular housing 16. A flared end 26 extends from the flange 24 to the end of the housing 21 and the stud is also formed with a reduced diameter portion at 27 extending from the ball end 14 to which cooperates with flared end 26 to provide substantial clearance for tilting or pivotal movement with respect to the housing 16 about the geometric center 28 of the ball end 14.

The bearing surface 22 is provided by a separate element 29 formed of an elastomeric material such as polyurathene or the like. The element 29, preferably molded with an unstressed shape discussed in detail below, is deformed from its unstressed shape during assembly to the shape or position illustrated in FIG. 2 in which it provides the bearing surface 22 in mating engagement with the ball end 14.

An externally threaded plug or disc 31 is threaded along the internal threads 18 of the housing 16 to a pre-load position in which it axially presses the elastomeric element 29 in a direction toward the ball end 14 with sufficient force to provide a predetermined pre-load of the ball end 14 between the two surfaces 22 and 23. The amount of such pre-load is selected to eliminate end play in the steering system by preventing any significant relative movement between the ball end 14 and the housing 16 in a direction along the axis of the tubular housing 16 and to provide the assembly with the desired amount of articulation torque.

The disc or plug 31 is preferably substantially flat and is provided with a non-circular opening 33 to receive a suitable wrench for rotating the disc along the thread 18 to the position in which the desired amount of pre-load is established. The desired pre-loading of the connection by the adjustment of the disc 31 is performed before the connection is installed on the end of the rack bar 10 while the disc is accessible. After the disc is properly positioned for proper pre-loading it is locked into position against rotation. In the illustrated embodiment the disc 31 is locked by staking the threads through a lateral opening 36 in the housing 16. Alternatively, other means such as thread locking chemicals may be used to permanently lock the disc or plug 31 in its adjusted position. This insures that the desired degree of pre-loading is maintained.

When the connection 12 is installed in a steering system it is merely necessary to thread the connection onto the threaded end 37 of the rack bar 10 until the end face 38 engages the rearward face of the disc 31. Suitable wrenching flats 39 is provided on the housing 16 for this purpose. Normally, during the installation of the connection the connection is torqued or tightened relatively tight on the threaded end 37 and the interengagement between the disc and the end face 38 serves to lock the connection in the installed position. Such engagement between the end face 38 and the disc however, does not produce any significant movement of the disc with respect to the housing since the only movement of the disc resulting from such engagement is the movement permitted because of clearances between the peripheral thread on the disc and the internal thread 18. Such clearances are sufficiently small so that the installation of the connection does not materially alter the pre-loading of the elastomeric element 29.

Tension forces between the tie rod 11 and the rack bar 10 are carried by the bearing surface 23 while the compression forces between such parts of the system are carried by the bearing surface 22. Under tension the force is transmitted along the tubular housing from the bearing surface 23 to the threaded connection between the threaded end 37 and the internal threads 18. The lengths of such threaded engagement is therefore selected to provide sufficient strength to withstand any load normally expected to be encountered during the use of the connection. Preferably disc 31 is therefore relatively thin to minimize the required length of the housing and to minimize manufacturing costs. In the illustrated embodiment it is safe to utilize a relatively thin disc 31 even though the compression forces through the connection are transmitted from the bearing surface 22 and through the disc 31 to the rack bar 10. This is because such forces resulting from compression loading need not be carried by the threaded connection between the disc 31 and the housing 16 but are carried by the direct engagement between the disc 31 and the end face 38 of the rack bar 10. In practice the strength of the threaded connection between the disc and the housing need only be great enough to withstand the pre-loading force prior to the installation of the connection and sufficiently great to retain the disc in the preload position against the axial force applied to the disc by the end face 38 when the housing is tightened onto the threaded end 37. In this latter condition, the preloading forces between the elastomeric element 29 and the disc assist the threads at the periphery of the disc in supporting the load applied by the end face 38 when the connection is installed.

Figure 4:
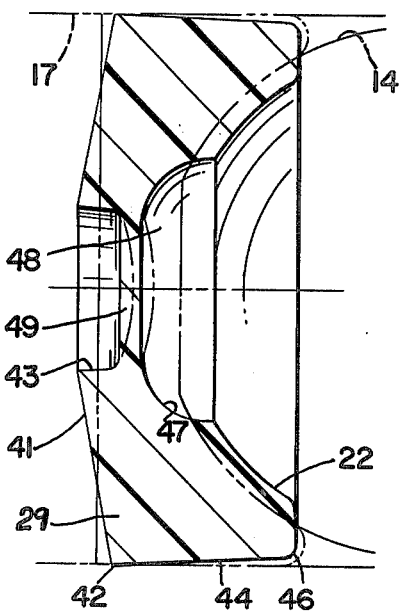
FIG. 4 is a fragmentary view of the elastomeric element illustrating in full line the unstressed shape of the elastomeric element and illustrating in phantom line the shape of such element after its installation in the connection.

Referring to FIG. 4, the elastomeric element 29 is preferably formed with an unstressed shape substantially as shown in full line. In its unstressed condition, the rearward face 41 is provided with a shallow conical shape which extends in a convex manner from its periphery at 42 to a central recess at 43. The outer surface or periphery 44 of the element 29 extends from the rearward edge at 42 with a gradually reducing radius to a forward end at 46. The unstressed radius of the bearing surface 22 is less than its radius after installation and prestressing. Radially inward of the bearing surface 22 is an axially extending recess 47 which provides clearance with respect to the ball end 14 to provide a cavity 48 which is preferably filled with a lubricant during the assembly of the connection 12. The cavity 48 is separated from the recessed portion 43 by a relatively thin wall 49.

As the pre-loading disc 31 is threaded toward the pre-load position illustrated in phantom line, the elastomeric element 29 is deformed from its unstressed shape causing the bearing surface 22 to expand out along the surface of the ball end 14 and causing expansion of the outer surface 44 into engagement with the inner wall of the tubular housing 17. Simultaneously, the rearward face 41 is deformed to an essentially flat condition. The elastomeric element when installed constitutes a relatively high rate spring which is pre-loaded by the disc 31 a sufficient amount so that there is substantially no end play in the connection under normal use. However, it functions to absorb road shock and to damper vibration during use. Further, the elastic deformation of the bearing surface in a substantially radial direction provides a structure in which significant pre-loading is retained even as wear occurs in the connection so that the connection can be satisfactorily used even after some wear has occurred.

Accurate pre-loading of the connection is accomplished with relative ease since substantial amounts of rotation of the disc produce relatively small axial displacement thereof. Therefore, it is merely necessary to rotate the disc 31 until the desired amount of pre-loading is achieved. The disc is then easily locked in its adjusted position by staking as mentioned above or by any other suitable means and the desired level of preloading on the joint is permanently established.

As mentioned above the amount of pre-load is not significantly altered when the connection is installed even if the connection 12 is tightly threaded on to the threaded end 37 since the only movement of the disc which can occur during such installation is the movement which is allowed by the very small clearance provided between the threads on the periphery of the disc and the internal threads 18. The elastomeric material provides a sufficient resiliency to accommodate such movement without excessive change in the preload.

Figure 5:
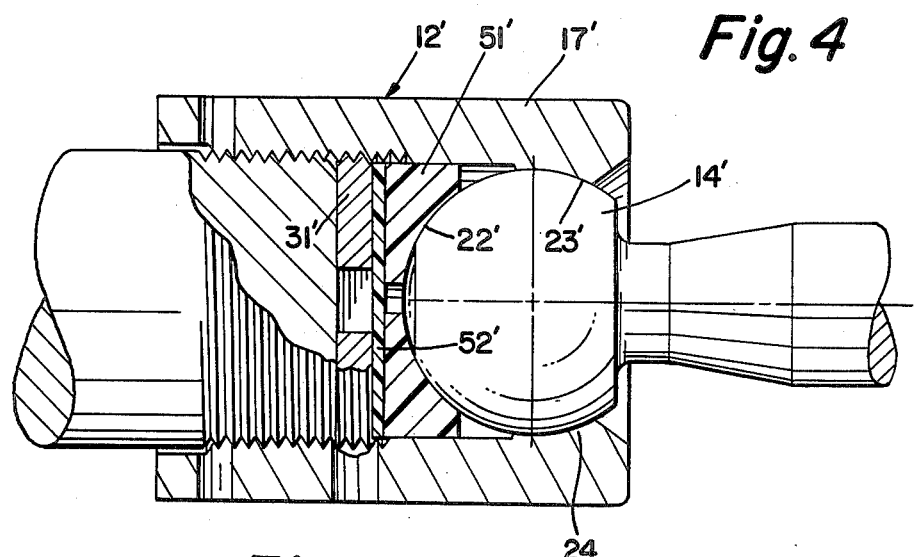
FIG. 5 is a fragmentary side elevation partially in longitudinal section illustrating a second preferred embodiment of this invention.

FIG. 5 illustrates another embodiment of this invention. In this embodiment similar reference numerals are used to designate similar parts with a prime (') added to indicate reference to the second embodiment. Here, again the connection 12' is provided with a tubular housing 17' which receives the ball end 14'. The bearing surface 23' is provided again by the housing 17'. In this embodiment however, the bearing surface 22' is provided by a separate element 51' formed of a relatively hard plastic such as nylon, acetal, or the like. In this embodiment a flat washer like elastomeric element 52' is positioned between the rearward face of the element 51' and the forward face of the disc 31' and constitutes the high rate spring structure of the connection 12'. Here, the preloading is accomplished by threading the disc 31' along the internal thread 18' until the proper unload is established and the disc is then locked in position by staking or by other suitable means. The accuracy of preloading which is easily obtainable by the use of the threaded disc minimizes the manufacturing costs while still providing functional reliability. The elastomeric material is selected so that the installation of the connection with the resulting small movement of the disc 31' permitted by the clearance between the threads is not sufficient to produce excessive preloading of the installed connection.

Although preferred embodiments of this invention are described in this application, it is to be understood that various modifications and rearrangements may be resorted to without departing from the scope of the invention disclosed and claimed.

What is claimed is:

1. An apparatus for connecting a drive member and a tie rod member in a dirigible wheel steering system comprising a ball stud formed with a ball end, a socket assembly including a tubular housing having an internal thread extending inwardly from one end and adapted to have one of said members threaded therein, said tubular housing enclosing said ball end at its other end, said socket assembly providing a pair of opposed bearing surfaces engaging opposite hemispheres of said ball end and journaling said ball stud for tilting and rotational movement with respect to said socket assembly, a disc forming part of said socket assembly threaded into said internal thread, high rate spring means operable between said disc and at least one of said bearing surfaces, said disc being threaded to a preload position in which it preloads said spring means and is locked in said position, said spring means causing said bearing surfaces to be resiliently biased against said ball end with a predetermined preload force due to preloading by said disc, the threaded connection between said disc and said internal thread being sufficiently strong to maintain said preload but insufficiently strong to safely support loads applied to said one bearing surface, said ball and socket assembly being installed in the steering system by threading said internal thread over the threaded end on one of said members until said threaded end engages said disc, said threaded end providing sufficient support for said disc when installed to safely support the loads applied to said one bearing surface during the use, and said internal thread and threads on said disc providing sufficiently small clearance in relation to the spring rate of said spring means to prevent the preloading force on said bearing surface from being excessively increased when said socket assembly is threaded onto said one member.

2. Apparatus as set forth in claim 1 wherein said spring means includes an elastomeric member providing said one of said surfaces.

3. Apparatus as set forth in claim 2 wherein said elastomeric member is provided with an unstressed shape in which the radius of said one of said surfaces is less than the radius of the portion of said ball engaged thereby, and said elastomeric member is radially extended adjacent to said one surface from its unstressed condition by the engagement of said one surface with said ball when said disc is threaded to said preload position.

4. Apparatus as set forth in claim 3 wherein said tubular housing is provided with a lateral opening adjacent the periphery of said disc, and the periphery of said disc is staked at said opening to permanently lock said disc in said preload position.

5. Apparatus as set forth in claim 1 wherein said disc is substantially flat and is formed with a non-circular opening adapted to receive a wrench for turning said disc within said tubular housing.

6. Apparatus as set forth in claim 1 wherein said one surface is provided by a substantially rigid separate member located in said tubular housing, and said spring means is an elastomeric element positioned between said separate member and said disc.

7. Apparatus as set forth in claim 6 wherein said separate element is formed of a substantially rigid plastic material.

8. An apparatus for use in steering dirigible wheels comprising a longitudinally movable rack bar, a tie rod connecting the rack bar and wheels, a ball and socket connecting joint comprising a tubular mounting assembly formed with an internal thread extending from one end for mounting said tubular assembly on a threaded end of the rack bar, a ball stud associated with the tie rod and formed with a ball end positioned within said mounting assembly adjacent to the other end thereof, said mounting assembly having first and second opposed bearing surfaces engaging opposite hemispheres of said ball and with one surface absorbing tension forces and the other surfaces absorbing compression forces between said ball stud and mounting assembly, an elastomeric element providing one of said bearing surfaces, and a plug forming part of said mounting assembly threaded into said internal threads applying a force operating to compress said elastomeric element and causing said surfaces to apply sufficient force on said ball end to prevent relative longitudinal movement between said ball stud and said mounting assembly while permitting tilting and rotation therebetween, said plug being adjustable by rotation along said internal thread to adjust the compression of said elastomeric member and being thereafter locked in its adjusted position, and the end of the rack threaded into said internal thread engaging said plug.

9. Apparatus as set forth in claim 8 wherein said elastomeric element is provided with an unstressed shape, and the portions of said elastomeric element adjacent said one surface are radially expanded from their unstressed shape as said plug is threaded to said preloading position whereby preloading of said ball end is maintained as wear occurs.

10. Apparatus as set forth in claim 9 wherein said elastomeric element is provided with a convex surface when unstressed, said plug engaging said convex surface and elastically deforming it to a substantially planar surface.

11. Apparatus as set forth in claim 8 wherein said plug is a flat disc-like element having an insufficient thread length to safely support said elastomeric element under loads encountered in use, and the engagement between said end of said rack and said plug provides sufficient support for said plug and said elastomeric element to safely support such loads.

12. Apparatus for use in steering dirigible wheels comprising a drive member movable to steer a dirigible wheel, a driven member connected between said drive member and wheel for steering said wheel in response to movement of said drive member, one of said members having a ball end and the other of said members having a threaded end, and a socket assembly having an internal thread threaded onto said threaded end and opposed bearing surfaces engaging opposite hemispheres of said ball end to permit tilting and rotational movement of said ball end with respect to said threaded end while preventing other substantial movement therebetween, a preloading plug forming part of said socket assembly threaded into said internal thread, high rate spring means operable between said plug and one of said surfaces, said preloading plug being rotated along said internal thread to a preloaded position in which it stresses said spring means and produces a force therein which resiliently urges said surfaces toward said ball with a predetermined preloading force, said threaded end engaging said plug with such engagement operating to lock said thread in said socket assembly and also operating to cause said threaded end to support said plug against high loads occurring during use of said steering system.

13. Apparatus as set forth in claim 12 wherein said spring means is provided by an elastomeric element which is preloaded by said preloading plug.

14. Apparatus as set forth in claim 13 wherein said one surface is provided by a separate element, and said elastomeric element is a disc-like element compressed between said plug and separate element.

15. Apparatus as set forth in claim 13 wherein said elastomeric element provides said one surface and is elastically deformed from its unstressed shape by said plug.

16. An apparatus for connecting a drive member and a tie rod member to a dirigible wheel steering system comprising a ball stud formed with a ball end, and a socket assembly including a tubular housing having an internal thread extending inwardly from one end and adapted to have one of said members threaded therein, said tubular housing enclosing said ball end at its other end, said socket assembly providing a pair of opposed bearing surfaces engaging opposite hemispheres of said ball end and journaling said ball stud for tilting and rotational movement with respect to said socket assembly, a disc threaded into said internal thread and forming part of said socket assembly, and high rate spring means operable between said disc and at least one of said bearing surfaces, said disc being threaded to a preload position in which it preloads said spring means, said spring means causing said bearing surfaces to be biased against said ball and with a predetermined preload force due to preloading by said disc, the threaded connection between said disc and internal thread being sufficiently strong to maintain said preload but insufficiently strong to safely support loads applied to said one surface, said internal thread extending axially outwardly from said disc to enable the threaded end portion of one of said members to be received in said housing by threading said internal thread over the threaded end of one of said members until said threaded end engages said disc to provide sufficient support for said disc when installed to safely support the loads applied to said one surface during the use and to connect said housing with said one member to prevent axial outward movement of said disc under the influence of force applied to said ball stud.

17. Apparatus as set forth in claim 16 wherein said spring means includes an elastomeric member providing said one of said surfaces.

18. Apparatus as set forth in claim 16 wherein said elastomeric member is provided with an unstressed shape in which the radius of said one of said surfaces is less than the radius of the portion of said ball engaged thereby, and said elastomeric member is radially extended adjacent to said one surface from its unstressed condition by the engagement of said one surface with said ball when said disc is threaded to said preload position.

19. Apparatus as set forth in claim 18 wherein said tubular housing is provided with a lateral opening adjacent the periphery of said disc, and the periphery of said disc is staked at said opening to permanently lock said disc in said preload position.

20. Apparatus as set forth in claim 16 wherein said disc is substantially flat and is formed with a noncircular opening adapted to receive a wrench for turning said disc within said tubular housing.

21. Apparatus as set forth in claim 16 wherein one surface is provided by a substantially rigid separate member located in said tubular housing, and said spring means is an elastomeric element positioned between said separate member and said disc.

22. Apparatus as set forth in claim 21 wherein said separate element is formed of a substantially rigid plastic material.

23. Apparatus for use in steering dirigible wheels comprising a drive member movable to steer a dirigible wheel, a driven member connected between said drive member and wheel for steering said wheel in response to movement of said drive member, one of said members having a ball end and the other of said members having a threaded end, and a socket assembly having an internal thread threaded onto said threaded end, and opposed bearing surfaces engaging opposite hemispheres of said ball end to permit tilting and rotational movement of said ball end with respect to said threaded end while preventing other substantial movement therebetween, a preloading plug forming part of said socket assembly threaded into said internal thread, high rate spring means operable between said plug and one of said surfaces, said preloading plug being rotated along said internal thread to a preload position in which it stresses said spring means and produces a force therein which resliently urges said surfaces toward said ball with a predetermined preloading force, said threaded end supporting said plug against high loads occurring during use of said steering system.

* * * * *

UNITED STATES PATENT AND TRADEMARK OFFICE
CERTIFICATE OF CORRECTION

PATENT NO. : 4,187,033
DATED : February 5, 1980
INVENTOR(S) : Leonard J. Zukowski It is certified that error appears in the above-identified patent and that said Letters Patent are hereby corrected as shown below:

Column 8, line 31, change "and" to --end--.

Signed and Sealed this

Twelfth Day of August 1980

[SEAL]

Attest:

SIDNEY A. DIAMOND

Attesting Officer

Commissioner of Patents and Trademarks